(12) United States Patent
Fellenstein et al.

(10) Patent No.: US 7,032,007 B2
(45) Date of Patent: Apr. 18, 2006

(54) APPARATUS AND METHOD FOR MONITORING INSTANT MESSAGING ACCOUNTS

(75) Inventors: Craig William Fellenstein, Brookfield, CT (US); Carl Phillip Gusler, Austin, TX (US); Rick Allen Hamilton, II, Charlottesville, VA (US); Harry Schatz, McLean, VA (US)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 10/004,955

(22) Filed: Dec. 5, 2001

(65) Prior Publication Data

US 2003/0105822 A1 Jun. 5, 2003

(51) Int. Cl.
*G06F 15/16* (2006.01)
(52) U.S. Cl. .................. 709/206; 709/203; 709/224
(58) Field of Classification Search ................ 709/206, 709/223–226, 203
See application file for complete search history.

(56) References Cited

U.S. PATENT DOCUMENTS

| 5,754,939 | A | 5/1998 | Herz et al. ............. 455/4.2 |
| 5,848,418 | A | 12/1998 | De Souza et al. |
| 5,987,606 | A | 11/1999 | Cirasole et al. |
| 5,987,611 | A | 11/1999 | Freund ................. 713/201 |
| 6,044,401 | A | 3/2000 | Harvey ................. 709/225 |
| 6,076,100 | A * | 6/2000 | Cottrille et al. .......... 709/203 |
| 6,138,142 | A | 10/2000 | Linsk ................... 709/203 |
| 6,233,618 | B1 | 5/2001 | Shannon ............... 709/229 |
| 6,260,041 | B1 | 7/2001 | Gonzalez et al. |
| 6,260,192 | B1 | 7/2001 | Rosin et al. ............. 725/39 |
| 6,332,141 | B1 | 12/2001 | Gonzalez et al. |
| 6,606,644 | B1 | 8/2003 | Ford et al. |
| 6,631,412 | B1 | 10/2003 | Glasser et al. |
| 6,633,855 | B1 | 10/2003 | Auvenshine |
| 6,691,162 | B1 * | 2/2004 | Wick ..................... 709/224 |
| 2001/0000192 | A1 | 4/2001 | Gonzalez et al. |
| 2001/0018687 | A1 | 8/2001 | Gonzalez et al. |
| 2001/0032203 | A1 | 10/2001 | Gonzalez et al. |

(Continued)

OTHER PUBLICATIONS

Oikarinen et al., "Request for Comments (RFC) 1459: Internet Relay Chat Protocol" Network Working Group, May 1993, 65 pages.

*Primary Examiner*—Zarni Maung
*Assistant Examiner*—Nghi Tran
(74) *Attorney, Agent, or Firm*—Duke W. Yee; David A. Mims, Jr.; Theodore D. Fay, III

(57) ABSTRACT

An apparatus and method for monitoring instant messaging user accounts are provided. The apparatus and method provide a mechanism by which transcripts of instant messages may be generated and analyzed to determine if inappropriate contact with unapproved users is occurring. A user is registered with an instant messaging service provider such that an indication as to whether or not transcripts of the user's instant messages should be stored. In addition, a listing of destination user identifications that are approved, and thus do not require transcripts, may be provided to the instant messaging service provider. Thereafter, when an instant message is received, a look-up of the source user identification of the instant message, and optionally, the destination user identification, may be used to determine if transcripts are to be stored. The transcript may be reported to an authorized recipient of the transcript. An analysis tool is provided for analyzing the content of the instant messaging transcripts to provide additional information regarding contacts in the transcript. Also, a mechanism for maintaining the integrity of the transcripts is also provided such that tampering will be identified and the instant messaging user account may be suspended.

1 Claim, 5 Drawing Sheets

U.S. PATENT DOCUMENTS

| | | | |
|---|---|---|---|
| 2002/0004907 A1* | 1/2002 | Donahue | 713/200 |
| 2002/0032770 A1* | 3/2002 | Fertell et al. | 709/224 |
| 2002/0049806 A1* | 4/2002 | Gatz et al. | 709/203 |
| 2002/0059098 A1* | 5/2002 | Sazawa et al. | 705/14 |
| 2002/0124053 A1 | 9/2002 | Adams et al. | |
| 2002/0174183 A1 | 11/2002 | Saeidi | |
| 2003/0060212 A1* | 3/2003 | Douglass | 455/456 |
| 2003/0236820 A1* | 12/2003 | Tierney et al. | 709/203 |

* cited by examiner

APPARATUS AND METHOD FOR MONITORING INSTANT MESSAGING ACCOUNTS

RELATED APPLICATION

The present invention is directed to similar subject matter as commonly assigned and co-pending U.S. patent application Ser. No. 10/004,925 entitled "Apparatus and Method for Monitoring and Analyzing Instant Messaging Account Transcripts," filed on even date herewith and hereby incorporated by reference.

BACKGROUND OF THE INVENTION

1. Technical Field

The present invention is directed to an improved data processing system. More specifically, the present invention is directed to an apparatus and method for monitoring instant messaging accounts.

2. Description of Related Art

Instant messaging has become an increasingly attractive mechanism for users of computing devices to communicate with one another. Instant messaging allows a user of a computing device to send a message over a network to another user that is also online at the same time. With instant messaging, a user inputs the names or identifications of other users with which he/she wishes to communication into a list. When any of those individuals logs-on to the network, the user is "instantly" notified of the presence of the other user on the network so that an interactive chat session may begin. During the interactive chat session, the instant messages are immediately routed to the user's computing devices and displayed on a pop-up window. In this way, two or more users may converse with one another in a simulated real-time manner through text messages. Examples of instant messaging systems include AOL's Instant Messenger (AIM), Microsoft Network Messenger Service (MSNMS), ICQ, Yahoo! Messenger and IBM Sametime Connect.

With the phenomenal growth of instant messaging, what once was an esoteric computer-based pursuit has become commonplace. With the proliferation of instant messaging systems, computer-to-computer "chatting" has become the primary computer pursuit for many users. Nowhere is this pastime more pervasive than in the early to mid-adolescent user community.

Unfortunately, with the ubiquity of this community's use comes problems. As noted in both common anecdotes from parents and either tragic or near-tragic newspaper stories, the rise of instant messaging has led to persons of ill-repute preying on children. It would therefore, be beneficial to have an apparatus and method for monitoring instant messaging accounts.

SUMMARY OF THE INVENTION

The present invention provides an apparatus and method for monitoring instant messaging user accounts. The present invention provides a mechanism by which transcripts of instant messages may be generated and analyzed to determine if inappropriate contact with unapproved users is occurring. With one exemplary embodiment of the present invention, a user is registered with an instant messaging service provider such that an indication as to whether or not transcripts of the user's instant messages should be stored. In addition, a listing of destination user identifications that are approved, and thus do not require transcripts, may be provided to the instant messaging service provider.

Thereafter, when an instant message is received, a look-up of the source user identification of the instant message, and optionally, the destination user identification, may be used to determine if transcripts are to be stored. If a transcript is stored, the transcript may be reported to an authorized recipient of the transcript such that the authorized recipient may examine the transcript to determine if inappropriate contacts are occurring.

In addition to the above, an analysis tool is provided for analyzing the content of the instant messaging transcripts to provide additional information regarding contacts in the transcript. This additional information may include ranked lists of contacts, time/date distributions, filtered transcripts, and the like.

Moreover, the present invention provides mechanisms for maintaining the integrity of the transcripts such that tampering will be identified. If tampering is identified, the instant messaging ability using the instant messaging user account may be suspended until restarted by an authorized recipient of instant messaging transcripts.

Other embodiments of the present invention involve registration of with a network service provider through which the present invention may be implemented. Still other embodiments include implementation of the present invention entirely locally within a computing device such that registration with a remotely located provider is not required. Other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The present invention provides an apparatus and method for monitoring instant messaging accounts. The present invention is implemented in a distributed data processing environment in which computing devices are coupled to one another and may communication with one another via network links. The following description is intended to provide a background description of an exemplary distributed data processing environment in which the present invention may be implemented.

Figure 1:
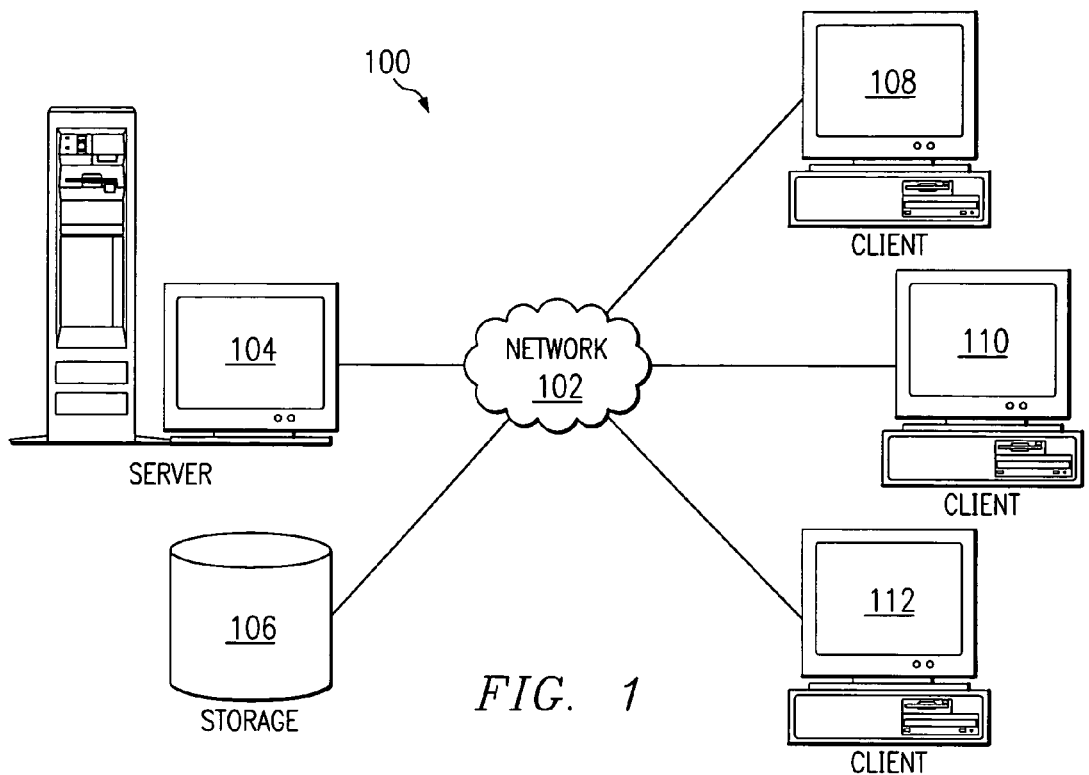
FIG. 1 is an exemplary diagram of a distributed computer system in accordance with a preferred embodiment of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
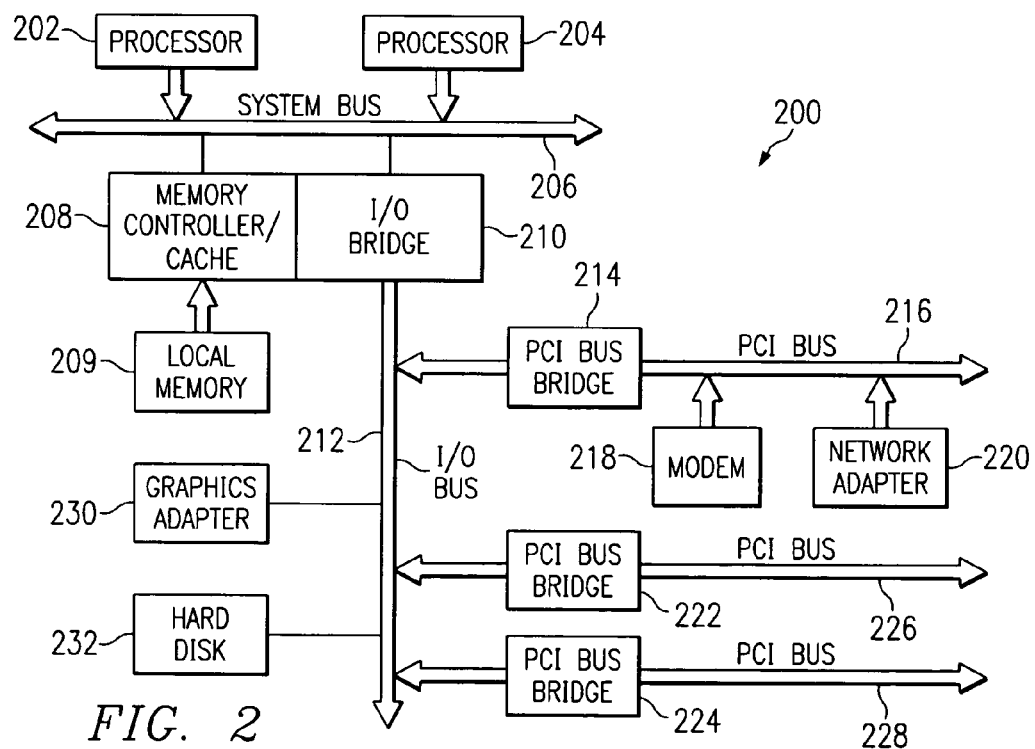
FIG. 2 is an exemplary block diagram of a server apparatus.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
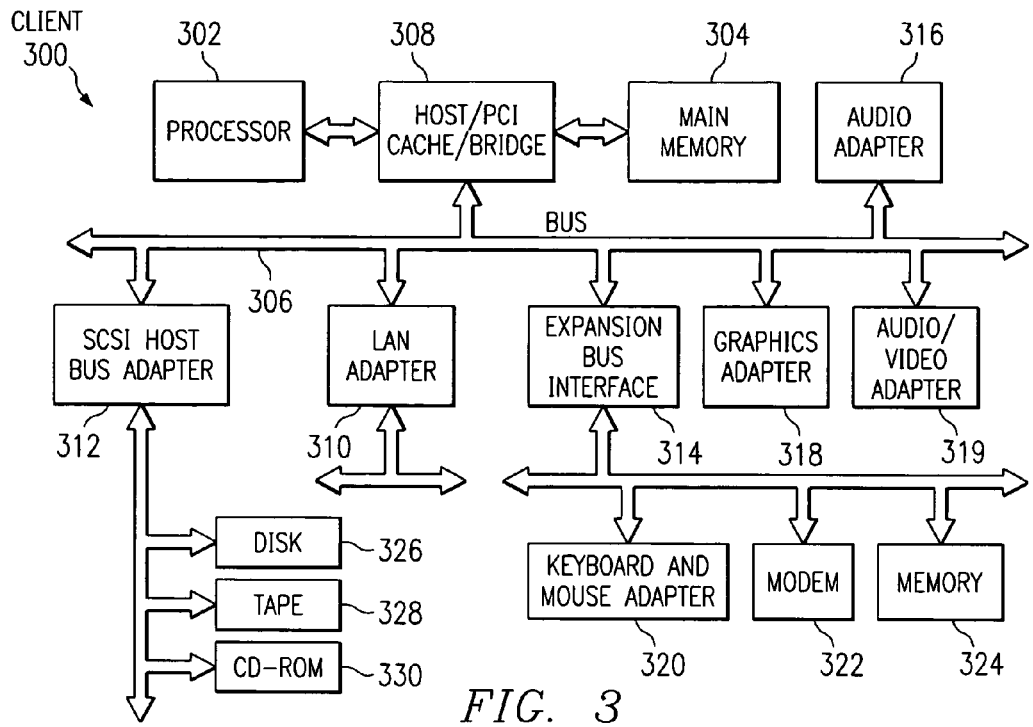
FIG. 3 is an exemplary diagram of a client device.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

With the present invention, client devices 108–112 include instant messaging client software that allows each of the client devices to establish lists of other users and/or user identifications with which communication is desired. The instant messaging service provider, such as server 104, includes software for monitoring of the network to determine if any of the users in the lists are currently logged-onto the network and for sending notifications to client devices 108–112 if any of the users in the lists associated with those client devices 108–112 are currently active on the network. The user of the client device, such as client device 108 for example, may then compose and transmit an instant message using the instant messaging client software.

The instant message transmitted by the client device 108 includes header information used for routing the instant message to the instant messaging service provider on server 104. The header information further includes an identification of the intended recipient of the instant message, such as the user or user identification of client device 110. Upon receipt of the instant message, the instant message service provider looks-up the intended recipient in a registered user database and determines the appropriate routing information for the intended user.

The instant messaging service provider may then create a session for the communication between the two users, repackage the instant message with a new header indicating the routing information for the intended recipient and the session identification, and transmit the repackaged message to the intended recipient. When the intended recipient responds with another instant message, the header for the instant message from the intended recipient will include the session identification information so that the instant messaging service provider need not perform the look-up of the instant messaging parties each time a new instant message is received.

In addition to routing instant messages between parties, with the present invention, the instant messaging service provider is enhanced to include mechanisms for storing a transcript of the instant message and/or instant messaging session and reporting the transcript to a party indicated as being an authorized recipient of the transcript. Whether or not to instigate storage of a transcript of the instant messaging session is determined based on the identifications of one or more of the parties involved in the instant messaging session. That is, when the users are registered with the instant messaging service provider, a check may be made as to whether transcripts of the instant messaging sessions of the user should be stored. This may involve, for example, requiring minors to be registered by their parents and having the parents choose whether or not the instant messaging sessions should be recorded. Thereafter, during the look-up of the user identifications of the parties in the instant messaging session, a determination may be made as to whether the registered user record indicates that a transcript of the instant messaging session should be stored.

With the present invention, when an instant message is received in an instant messaging session, a copy of the instant message may be stored as part of a transcript in a log file of the instant messaging session. When the instant messaging session is completed, the transcript or log file may be reported to the parent, guardian, or other designated recipient of the transcript. Such reporting may include, for example, sending the transcript or log file as an attachment to an electronic mail message addressed to the designated recipient of the transcript. Other methods of reporting the transcripts or log files include, but are not limited to, displaying the transcripts or log files by way of a password protected web page when the authorized transcript recipient logs-onto the instant messaging service provider, sending an instant message to the designated recipient indicating that a new transcript is available for review, sending a hard copy of the transcript or log file by conventional mail to the designated recipient, sending the transcript or log file by electronic mail in an electronic mail-by-demand type system, and the like.

The transcripts in the log file may include the instant messages sent between the parties, a timestamp of the instant messaging session or messages themselves, an identification of the parties involved, and the like. The transcripts may be provided in a variety of different ways including free text, encrypted text which the parent/reader can only access with a password, binary files readable by any other standard text processing software, e.g., Microsoft Word, or the like.

In an alternative embodiment, when registering the user with the instant messaging service provider, an indication of known parties with which instant messaging is allowed without storing a transcript may be provided. For example, a parent or guardian may choose to allow their child some measure of privacy by designating with which friends the child may communicate without having a transcript reported to the parent. In such a case, when the instant messaging service provider looks-up the routing information for the parties involved in the instant messaging session, the instant messaging service provider can compare the user identifications with the list of "approved" parties and determine whether to store a transcript of the instant messaging session.

In yet another embodiment of the present invention, the instant messaging service provider may include a utility tool for parsing and analyzing the stored transcripts to aid parents, guardians, and other designated recipients of the transcripts, in identifying aspects of the transcripts that may be of special need of attention. For example, the utility tool may provide a ranked list of user identifications for the most frequent incoming instant messages, a ranked list of user identifications for the most frequent outbound target user identifications, a ranked list of the most frequent recent incoming or outbound user identifications (as determined from timestamps and a time range from the current time), a date/time distribution of messages (for curfews, after-hours contacts, parents out of town, etc.), tracking of contact patterns for a particular user identification, filtering for interesting or dangerous text such as proper names, home addresses, home phone numbers, phrase such as "call me," "meet me," "send money," "send picture," offensive language, URLs, etc., and an ability to save a secondary transcript files that are pre-indexed and have been filtered to remove irrelevant or harmless messages, such as by date or user identification.

The automated sifting and parsing of the transcripts to deliver this information to the guardian's fingertips allows review of potentially undesirable contact by the minor in the shortest possible timeframe. In addition, this enhancement may be seen as somewhat less intrusive, as it mitigates the need for exhaustive readings by the parent in making the determination of appropriate and inappropriate contact.

The functions of the present invention have been described as being part of the instant messaging service provider on a server that is logged-onto by the client devices involved in the instant messaging session. However, the present invention is not limited to such a configuration. Rather, the functions of the present invention may be implemented as part of the instant messaging service provider, a network service provider positioned between the client device and the instant messaging service provider, or the client devices themselves. Each of these alternative embodiments will be described with reference to FIGS. 4A–4C hereafter.

Figure 4A:
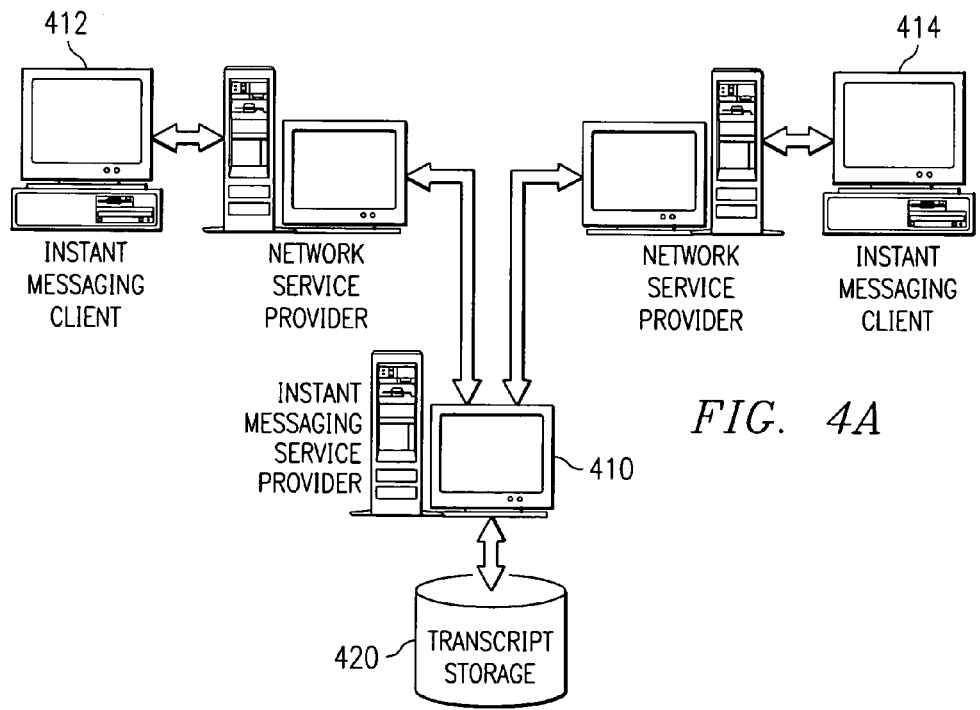
FIG. 4A is an exemplary diagram of a first embodiment of the present invention.
Figure 4B:
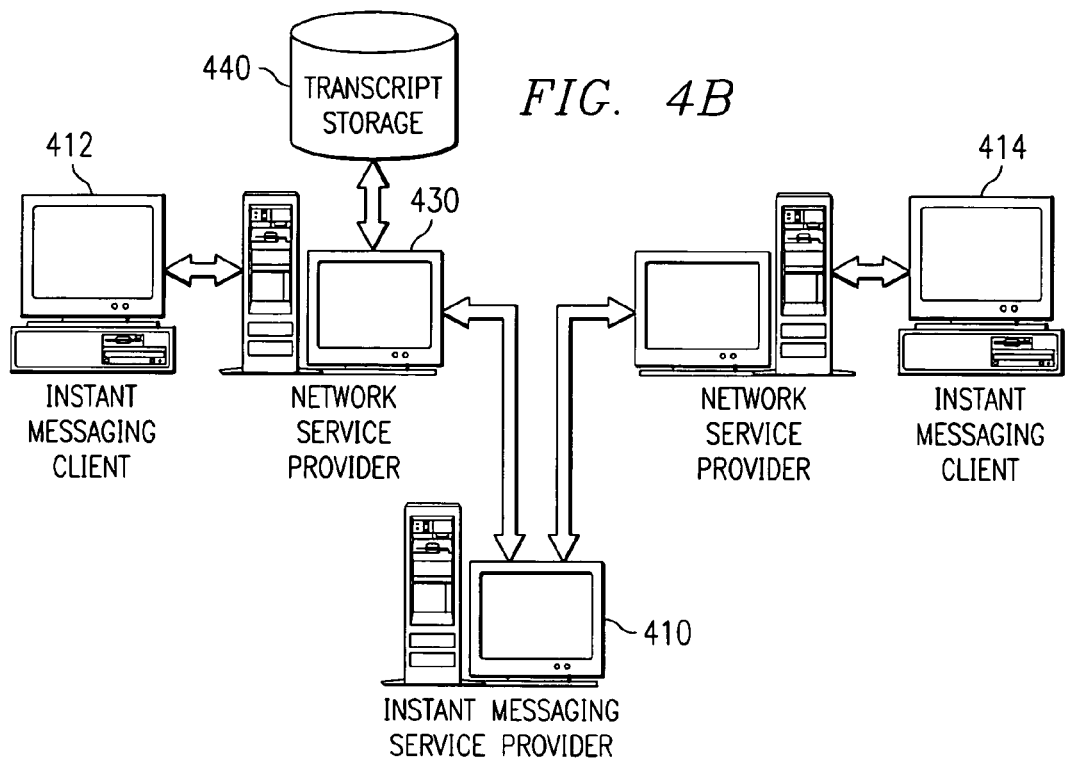
FIG. 4B is an exemplary diagram of a second embodiment of the present invention.
Figure 4C:
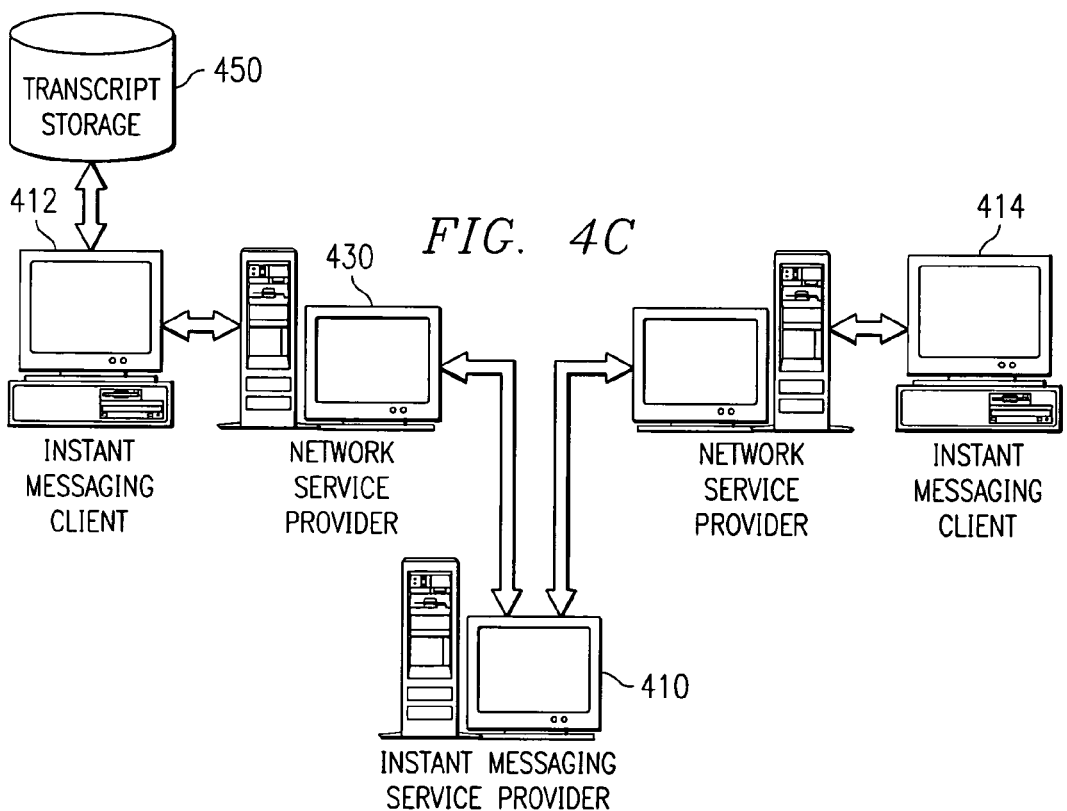
FIG. 4C is an exemplary diagram of a third embodiment of the present invention.

FIGS. 4A–4C illustrate various embodiments of the present invention. FIG. 4A illustrates the operation of the present invention in an embodiment where the functions of the present invention described above are performed by the instant messaging service provider. The operation is the same as described above. That is, the instant messaging service provider 410 performs the functions of the present invention regarding look-up of user identifications of users of client devices 412 and 414, establishment of an instant messaging session, routing of messages, compilation of transcripts, analysis of transcripts, reporting of transcripts, and the like. The transcripts may be stored in the database 420 or other storage medium.

FIG. 4B illustrates an alternative embodiment of the present invention in which the functions of the present invention are performed by a network service provider, such as an Internet service provider (ISP). As shown in FIG. 4B, the network service provider 430 has an associated transcript storage device 440. With this embodiment, rather than basing recordation of transcripts only on user identifications, the network service provider 430 also monitors unique ports.

Communication with many network services is performed over predetermined and unique ports. For example, URL look-up, i.e. web access via a traditional browser, typically occurs on a standard port 80. Similarly, secure SSL connections are typically accomplished on another standard port 443. Likewise, many instant messaging services also operate on their own unique ports, such as AOL Instant Messenger operating over port 5190, Lotus Sametime operating over port 1533, and Yahoo! Messenger operating over port 5050.

The network service provider 430, as an intermediary body conducting traffic between the client device 412 and the instant messaging service provider, has the ability to monitor the ports upon which traffic is conveyed. Thus, the network service provider 430 may monitor traffic for two criteria: firstly, the ports used by known instant messaging services; and secondly, activity by any predetermined user identification.

In this embodiment, the instant messaging service provider operates in the manner generally known in the art, however the functions of the present invention are implemented by the network service provider. Thus, the instant messaging service provider does not need to be modified from known instant messaging service providers.

In this embodiment, in addition to registering with the instant messaging service provider, the user must also register with the network service provider with regard to instant messaging preferences. That is, the user, or guardian of the user, must register the user with the network service provider by providing information about the user, generating a user identification, indicating whether transcripts are to be stored, optionally providing a listing of other parties for which transcripts are not required, and indicating the user identification and other information about the designated party to receive the transcripts.

When the network service provider 430 receives traffic from the client device 412 on one of the unique ports identified as being associated with an instant messaging service, the network service provider 430 may then perform a look-up of the user identification information for the user of the client device 412 and optionally the user identification information for the user of the client device 414. If the look-up indicates that a transcript should be stored, the network service provider 430 stores a copy of the instant message in a log file in the transcript storage device 440 in association with the user identification of the user of the client device 412.

The transcripts in the transcript storage device 440 may be analyzed at the time that they are stored in the transcript storage device 440 or at a later time, such as in response to a request by an authorized recipient of the transcripts. The transcripts, and/or optionally the results of analysis of the transcripts, may be provided to the designated authorized recipients of the transcripts. Providing the transcripts to the designated authorized recipients may be performed on a periodic basis, in response to a condition, such as the results of the analysis indicating a potential problem, in response to a request from the authorized recipient, or the like.

FIG. 4C illustrates a third possible embodiment of the present invention in which the transcripts of the instant messages are stored in a storage device 450 that is local to the client device 412. This storage device 450 may be a hard disk, floppy drive, writeable CD-ROM drive, magnetic tape drive, or the like, associated with the client device 412.

This embodiment is similar to the embodiment shown in FIG. 4B with the exception that the functions of the present invention are performed on the client device 412 rather than at the network service provider. With this embodiment, the user is registered with the local instant messaging client software by providing the necessary information for identifying the user, a list of user identifications of users with which communication is sought, optionally a list of user identifications for which transcripts are not recorded, identification of an authorized recipient of transcripts, and the like. Thus, with this embodiment, registration with a remotely located provider is not necessary for the present invention to operate. However, registration with a remotely located provider may be used in conjunction with this embodiment without departing from the spirit and scope of the present invention.

This embodiment, however, provides security concerns regarding the storage of transcripts that may or may not be present with the embodiments described in FIGS. 4A and 4B. That is, because the transcripts are stored locally, it becomes easier for users that are being monitored by the storage of transcripts, to attempt to access these transcripts and either delete them or otherwise modify them to circumvent the monitoring being performed. This same security concern is not as prevalent in the embodiments shown in FIGS. 4A and 4B because the instant messaging service provider and network service provider can be used to control access to the transcripts, for example, by password protection, encryption, and the like. However, the security mechanism of the present invention may also be used with the embodiments shown in FIGS. 4A and 4B in order to provide additional security against tampering of transcripts and transcript log files.

While password protection and encryption may be used with locally stored transcripts, the ability for a monitored individual to access and modify these files is still higher when the files are accessible locally. Thus, the present invention provides a mechanism by which, if actions are taken by an unauthorized user to modify the transcript files, such actions are immediately made obvious to the person monitoring the transcripts. In addition, the mechanism of the present invention also provides for disabling of the instant messaging service in the event of tampering with the transcript files until the instant messaging service is reactivated by the designated authorized recipient of the transcripts.

The mechanism of the present invention involves creating a log file on the hard disk of the client device at the time that the user is registered with the instant messaging service client software. This log file contains non-viewable fields that include a unique identifier, such as a cyclic redundancy check for example, as well as a time/date code. This log file may be viewable through a utility integrated with the instant messaging service client software without the non-viewable fields.

In addition to creating this log file, a hidden file is also created that includes the unique identifier and the time/date code. In operation, upon commencement of an instant messaging activity, the instant messaging service client software checks the unique identifier and timestamps between the hidden fields in the log file and the hidden file. If there is a match, then the instant messaging activity is permitted. The instant message is then added to the log file.

With each instant messaging transaction (message sent or message received), the timestamp in both the hidden fields of the log file and the hidden file is updated. This log file continues to grow until maintenance is conducted by the authorized recipient of the transcripts.

If the log file is deleted, the instant messaging service client software is disabled so that further instant messaging is not available. This is because the initial check of timestamps will result in a mismatch (due to the fact that one timestamp is not available). In this way, the user that is being monitored will not be able to simply delete the log file in order to avoid being monitored.

Furthermore, if the user being monitored attempts to circumvent the log process by copying the known log file into a secondary location, completing an instant messaging session, and then replacing the undesirable log file with the one that was moved to the secondary location, the timestamps will not match. Thus, when the timestamp check is performed, a mismatch will be detected and the instant messaging service client software will be disabled.

Thus, the present invention provides an apparatus and method by which transcripts of instant messages may be compiled, analyzed and reported to authorized recipients of the transcripts. The present invention provides a mechanism by which the instant messaging sessions of users may be monitored by authorized individuals to determine if the users are engaged in inappropriate communication with other parties.

As described above, there are a number of different embodiments in which the present invention may be implemented. However, regardless of the particular embodiment chosen, there are primary functional components that are the same in each of the embodiments. These components are now described with reference to FIG. 5.

Figure 5:
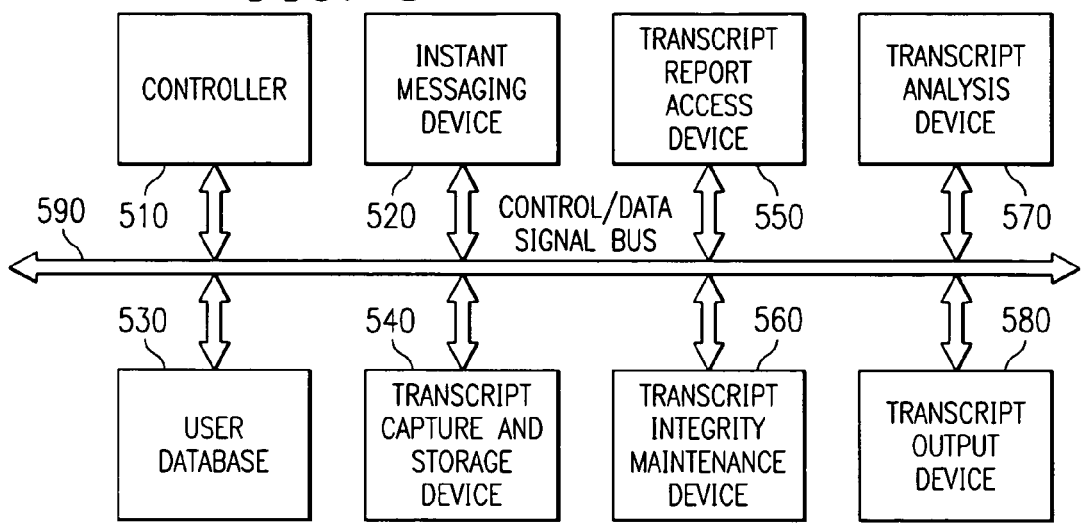
FIG. 5 is a diagram illustrating an instant messaging mechanism according to the present invention.

FIG. 5 is an exemplary block diagram of an instant messaging service mechanism according to the present invention. The elements shown in FIG. 5 may be implemented in hardware, software, or any combination of hardware and software. In a preferred embodiment, the elements in FIG. 5 are implemented as software instructions executed by one or more processing devices. These software instructions and processing devices may be part of an instant messaging service provider, a network service provider, a client device, or may be distributed across one or more of an instant messaging service provider, network service provider and client device.

As shown in FIG. 5, the instant messaging mechanism includes a controller 510, an instant messaging device 520, a user database 530, a transcript capture and storage device 540, a transcript report access device 550, a transcript integrity maintenance device 560, a transcript analysis device 570, and a transcript output device 580. These elements 510–580 are coupled to one another by way of the control/data signal bus 590. Although a bus architecture is shown in FIG. 5, the present invention is not limited to such and any architecture that facilitates communication of control/data signals between the elements 510–580 may be used without departing from the spirit and scope of the present invention.

The controller 510 controls the overall operation of the instant messaging mechanism and orchestrates the operation of the other elements 520–580. In operation, the controller 510 receives a request for log-on by a client device so that the client device may begin instant messaging. The log-on request may include user identification information and password information that may be verified by information stored in the user database 530, for example.

Once the log-on request is verified, and an instant message is received from the client device, the controller 530 looks-up the user information in the user database 530 to determine if a transcript should be generated. This look-up may involve retrieving a user database record and determining if a transcript field indicates that a transcript should be generated. In addition, this look-up may include checking the destination user identification against a listing of approved user identifications to determine if the transcript is not necessary for the instant message.

Whether or not a transcript is to be generated, the instant message is sent to the instant messaging device 520 for repackaging with a new header to route the instant message to the designated destination. If a transcript is to be generated, however, the controller 510 instructs the instant messaging device 520 to start an instant messaging session for the user. In addition, the transcript capture and storage device 540 generates a transcript log file to which transcripts of the instant messages to that destination user identification, or any other user identification that is not part of the approved list, are stored. The copies of the instant messages stored as transcripts in the log file include the content of the instant message, timestamp information, source user identification information, destination user identification information, and other information as deemed necessary to the particular embodiment.

At the time the instant message is stored, or at some later time after the transcripts have been stored in the transcript log file, the transcript analysis device 570 may be used to analyze the log file in order to provide aid to an authorized transcript recipient in determining if inappropriate contact with other users has taken or is taking place. The analysis may provide, among other possibilities, a ranked list of user identifications for the most frequent incoming instant messages, a ranked list of user identifications for the most frequent outbound target user identifications, and a ranked list of the most frequent recent incoming or outbound user identifications. In order to perform such analysis, the log file may be examined such that each user identification appearing in the source field and the destination field of the transcript records is stored and a tally of each time that user identification appears in one of these fields is kept. From these tallies, a ranked listing, such as those described above, may be generated for use by an individual monitoring the use of the user's instant messaging account.

In addition, a date/time distribution of messages and tracking of contact patterns for a particular user identification may be provided through the transcript analysis device. For example, the timestamps of each transcript record may be examined to determine at what times, days of the week, and the like, the user account is being used to contact a particular destination user identification or when the particular destination user identification is being used to contact the user of the user account being monitored. From this, a pattern of activity may be plotted and provided to the individual monitoring the user account.

Moreover, the analysis of the transcripts may include filtering the transcripts for interesting or dangerous text such as proper names, home addresses, home phone numbers, phrase such as "call me," "meet me," "send money," "send picture," offensive language, URLs, etc. and the transcript analysis device may have an ability to save a secondary transcript file that is pre-indexed and filtered to remove irrelevant or harmless messages. Such text filtering may include comparing words or phrases in the instant messages to a dictionary of inappropriate or "red flag" words and phrases and marking them accordingly such that the are displayed or otherwise provided to the individual monitoring the user account in a conspicuous manner. Moreover, generating a secondary transcript file that is pre-indexed and filtered may include determining the instant messages having such "red flag" words and phrases and storing only those instant messages in the secondary transcript file.

The transcript report access device 550 is responsible for generating and controlling the dissemination of instant messaging transcript reports. The transcript report access device 550 determines when, whether, and where to transmit transcript reports. The determination of when to transmit a transcript report depends on the particular embodiment. As previously noted, this may include transmitting the transcript at predetermined times or upon the occurrence of an event, such as the termination of an instant messaging session, an authorized transcript recipient requesting the transcript, or the like. In addition, the transcript report access device 550 may perform access verification and authorization to determine if individuals logging onto the instant messaging mechanism and requesting reports are authorized to receive them. Such verification, in one exemplary embodiment, may include password verification.

The transcript report access device 550 generates the transcript report, either periodically or in response to the occurrence of an event, and transmits the report by way of the transcript output device 580. The transcript output device 580 may be an electronic mail program, a web page, conventional mail, or the like.

The transcript integrity maintenance device 560 is used to determine if any unauthorized tampering has occurred with regard to the transcript log files. Such determinations may be made by comparing hidden fields in the transcript log file and information stored in a hidden location of the transcript storage device, as detailed previously. The transcript integrity maintenance device 560 may be used at the time that a determination is being made as to whether to store a transcript or not. If a transcript is to be stored, the transcript integrity maintenance device 560 may perform a check of the existing transcript log file to determine if the timestamp information indicates tampering. If so, the instant messaging device 520 may be disabled so that instant messaging is not allowed to continue.

Figure 6:
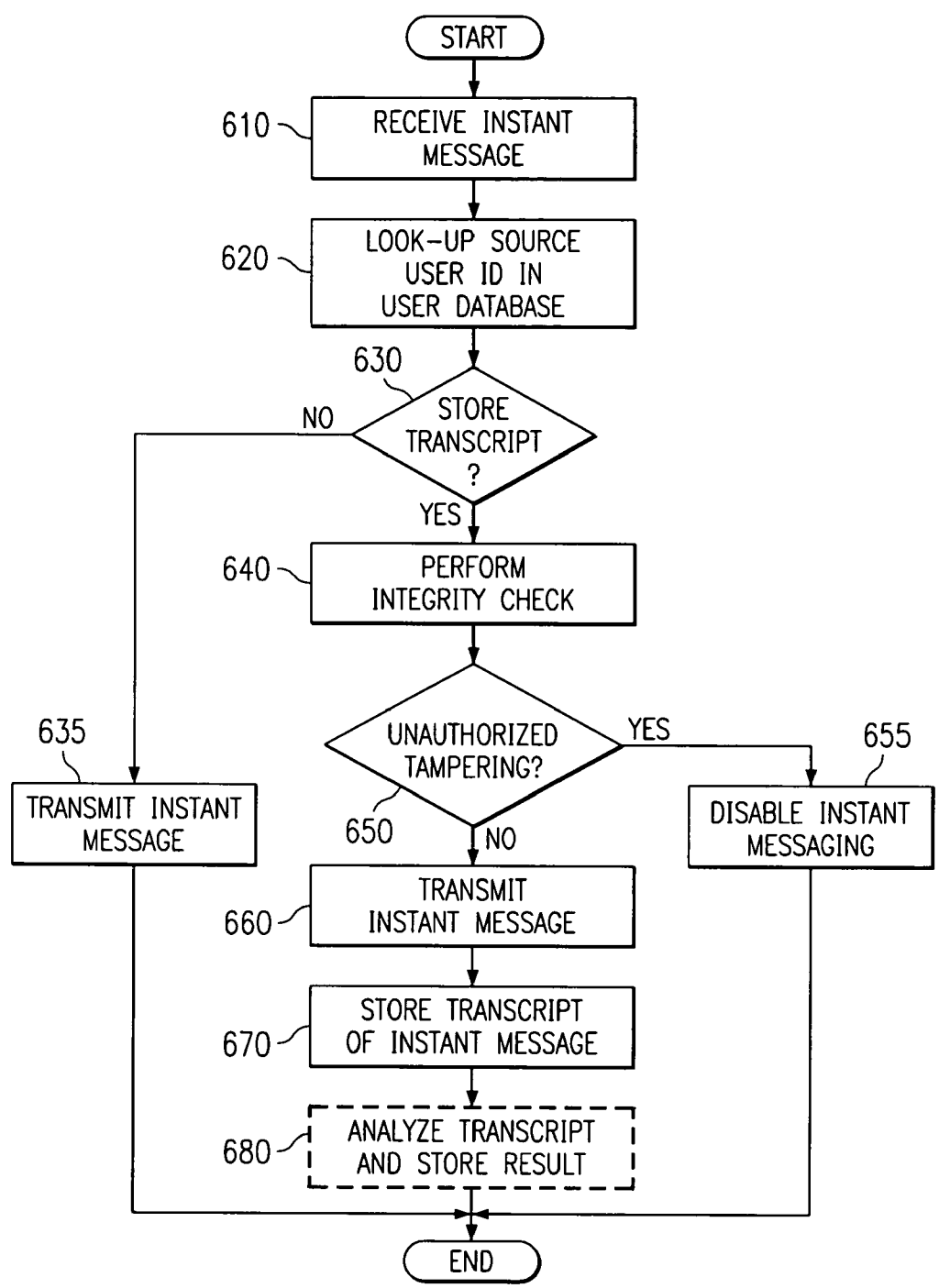
FIG. 6 is a flowchart outlining an exemplary operation of the present invention when generating an instant message transcript.

FIG. 6 is a flowchart outlining an exemplary operation of the present invention when storing a transcript of an instant message. The steps shown in FIG. 6 are only exemplary. Many of the steps are optional and many may be performed in a different order than that shown in FIG. 6 without departing from the spirit and scope of the present invention. No limitation is intended or should be inferred by the steps shown in FIG. 6.

As shown in FIG. 6, the operation starts with receipt of an instant message (step 610). The source user identification is looked-up in the user database (step 620) and a determination is made as to whether or not a transcript of the instant message is to be stored (step 630). This determination may be based solely on the source user identification or may also be based on the destination user identification as compared to a listing of approved contacts. In addition, this look-up may be made more efficient by generating a session in which the look-up is done once for the source user identification, or combination of the source user identification and the destination user identification, and thereafter all instant messages with that source user identification, and optionally destination user identification, are handled in the same manner.

If a transcript is not to be stored, the instant message is simply transmitted to the destination indicated by the destination user identification (step 635). If a transcript is to be stored, an integrity check may be performed on the transcript log file to determine if there has been any unauthorized tampering (step 640). If unauthorized tampering has been detected (step 650), the instant messaging is disabled (step 655) and the instant message is not transmitted. Instant messaging is not resumed until an authorized recipient of instant message transcripts instructs the resumption of instant messaging using this user account.

If unauthorized tampering is not detected (step 650), the instant message is transmitted to the identified destination (step 660), and a copy of the instant message with timestamp information, source user identification information, destination user identification, and the like, are stored as a transcript of the instant message (step 670). Optionally, the transcript may be analyzed to determine characteristics of the transcript that are of interest to an individual monitoring the use of the instant messaging user account (step 680). The operation then ends.

Figure 7:
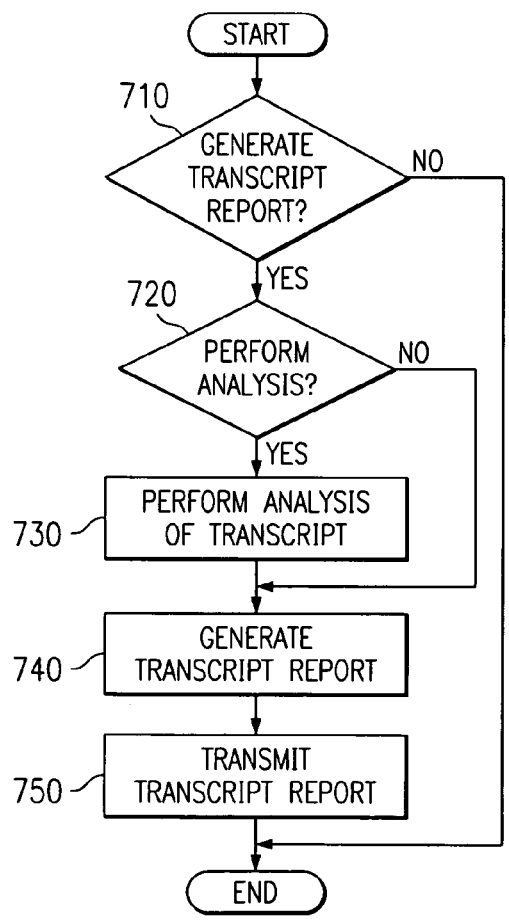
FIG. 7 is a flowchart outlining an exemplary operation of the present invention when generating a transcript report.

FIG. 7 is a flowchart outlining an exemplary operation of the present invention when generating a transcript report. As with FIG. 6, the steps shown in FIG. 7 are only exemplary. Many of the steps are optional and many may be performed in a different order than that shown in FIG. 7 without departing from the spirit and scope of the present invention. No limitation is intended or should be inferred by the steps shown in FIG. 7.

As shown in FIG. 7, the operation starts with a determination as to whether a transcript report is to be generated (step 710). This determination may be based on whether or not a predetermined time has elapsed or an event has occurred, for example. In addition, the determination may be based verification of a transcript report request from a user.

If the transcript report is to be generated, a determination is then made as to whether the transcript is to be analyzed and results of the analysis provided in the transcript report (step 720). Such a determination may involve looking at preferences stored in the user record of a user database, attributes of a transcript report request, or the like.

If an analysis is to be performed, the analysis is performed on the transcript (step 730) and thereafter, or if analysis is not to be performed, a transcript report is generated (step 740). This transcript report may include the results of any analysis performed in step 730. The transcript report is then transmitted to the authorized recipient of the transcript report (step 750). This transmission may include electronic mail attachments, electronic mail messages themselves, one or more web pages, or mailing by conventional mail, for example.

Thus, the present invention provides a mechanism by which instant messaging user accounts may be monitored to determine if inappropriate communications are being sent or received using the instant messaging user account. The present invention is especially useful for parents of children who make use of instant messaging. Through the present invention, parents may view the conversations being conducted by their children with unapproved individuals and thereby, make sure that the child is not getting involved with predators looking to exploit the innocence of the child.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product in a computer readable medium for monitoring use of an instant messaging user account, comprising:

first instructions for receiving an instant message;

second instructions for determining if a log of the instant message is to be stored;

third instructions for storing the log of the instant message in storage device if the log of the instant message is to be stored; and fourth instructions for providing the log to a designated monitor of the instant messaging user account;

wherein the second instructions for determining if a log of the instant message is to be stored further include:

instructions far looking up a user identification of a source of the instant message in a user database;

instructions for determining if a log field indicates if a log is to be stored;

instructions for looking up a user identification of a destination of the instant message in an approved contact list; end instructions for determining that a log is to be stored if the user identification of the destination does not appear in the approved contact list.

\* \* \* \* \*